(12) United States Patent
Durham et al.

(10) Patent No.: US 7,514,832 B2
(45) Date of Patent: Apr. 7, 2009

(54) SINGLE FIELD ROTOR MOTOR

(75) Inventors: Gary L. Durham, Stuart, FL (US); Harold S. Durham, Stuart, FL (US)

(73) Assignee: Tri-Seven Research, Inc., Wichita, KS (US)

( * ) Notice: Subject to any disclaimer, the term of this patent is extended or adjusted under 35 U.S.C. 154(b) by 306 days.

(21) Appl. No.: 10/547,940

(22) PCT Filed: Feb. 17, 2004

(86) PCT No.: PCT/US2004/004476

§ 371 (c)(1), (2), (4) Date: Sep. 2, 2006

(87) PCT Pub. No.: WO2005/091475

PCT Pub. Date: Sep. 29, 2005

(65) Prior Publication Data

US 2007/0063609 A1    Mar. 22, 2007

(51) Int. Cl.
H02K 21/38    (2006.01)

(52) U.S. Cl. .................. 310/155; 310/178; 310/166

(58) Field of Classification Search .................. 310/155, 310/178, 166–168, 216, 269, 254
See application file for complete search history.

(56) References Cited

U.S. PATENT DOCUMENTS

| | | | | | |
|---|---|---|---|---|---|
| 3,950,663 | A | * | 4/1976 | Mead | 310/49 R |
| 4,080,542 | A | * | 3/1978 | De Graffenried | 310/159 |
| 4,348,605 | A | * | 9/1982 | Torok | 310/168 |
| 5,111,095 | A | * | 5/1992 | Hendershot | 310/168 |
| 5,923,142 | A | * | 7/1999 | Li | 318/701 |
| 5,929,590 | A | * | 7/1999 | Tang | 318/701 |
| 6,972,504 | B1 | * | 12/2005 | Hsu | 310/156.56 |

FOREIGN PATENT DOCUMENTS

| | | | |
|---|---|---|---|
| EP | 1 304 790 | A | 4/2003 |
| WO | 03/003546 | A | 1/2003 |

* cited by examiner

*Primary Examiner*—Thanh Lam
(74) *Attorney, Agent, or Firm*—Young Basile

(57) ABSTRACT

An electric motor having a single field rotor wherein the flux within the rotor is generated by magnetic means located at the end regions of the motor housing such that the flux within the motor rotor maintains a constant polarity.

9 Claims, 10 Drawing Sheets

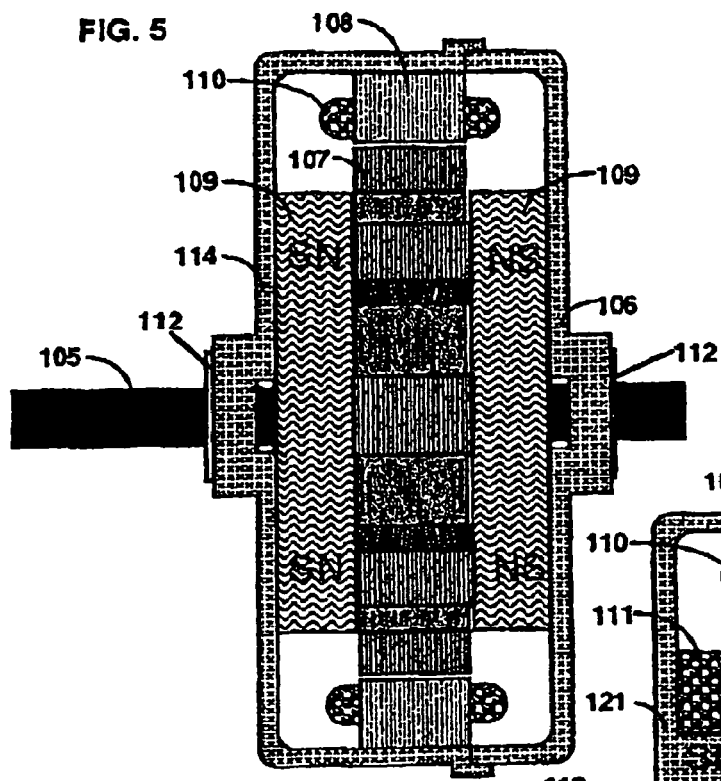
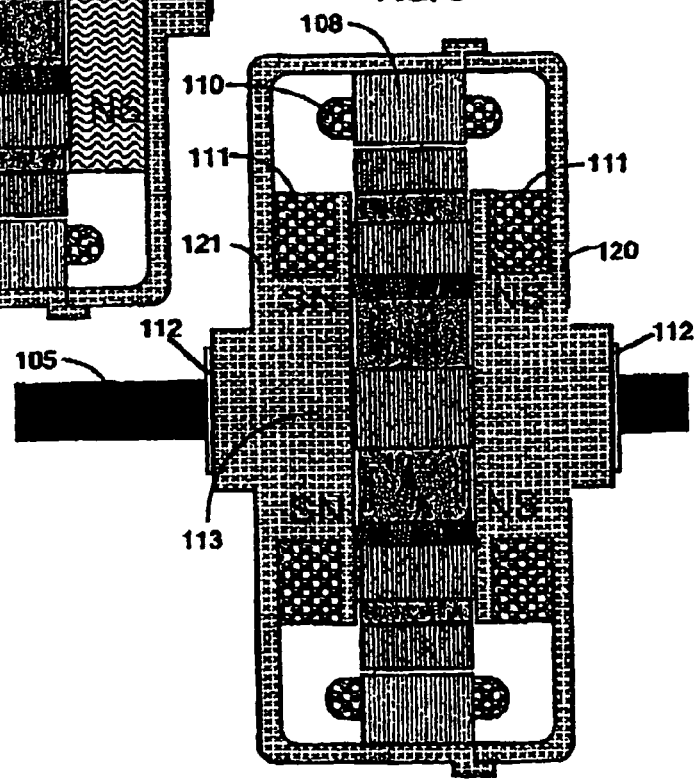

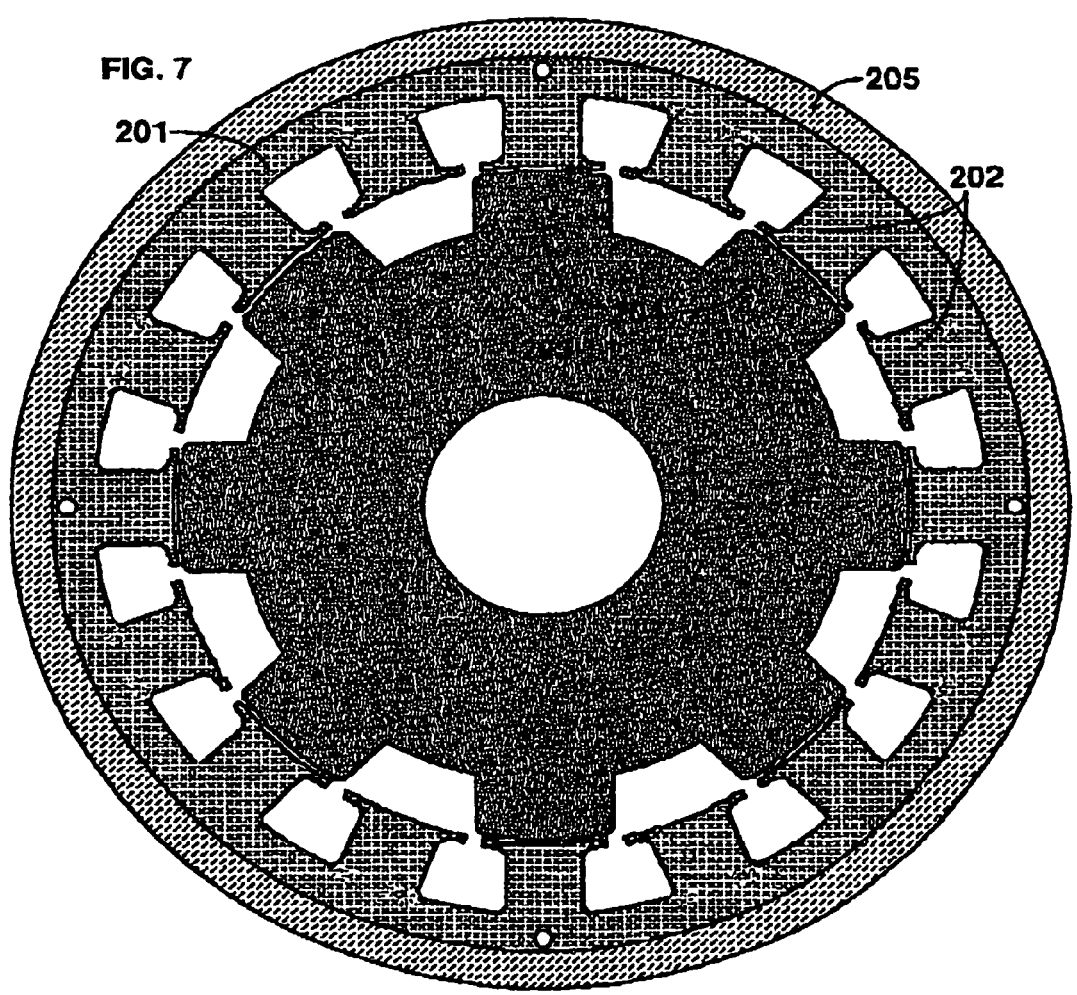

SINGLE FIELD ROTOR MOTOR

FIELD OF THE INVENTION

The invention pertains to a single field rotor motor wherein a minimum of alternating flux fields in the total flux circuit of the motor that produces the motor torque are created. The result is that the creation of a non-reversing flux field in a major portion of the stator and rotor parts creates less losses and produces greater efficiency in the overall motor operation.

DESCRIPTION OF THE RELATED ART

In typical electric motor construction and theory, alternating flux fields are created, and various systems are utilized to unbalance these flux fields so that a rotation of the motor rotor would occur. Reversing flux fields are created in conventional electric motor devices, and because of the necessity to overcome non-work flux fields, the efficiency of the motor is adversely affected. Over the years, various structural and theoretical systems have been produced in the electric motor art to overcome such conventional inefficiencies, but heretofore, electric motor efficiencies have not been high, especially in fractional horsepower motors, commonly not reaching better than 50% at best, and known electric motors are inefficient in converting electrical energy to mechanical energy.

SUMMARY OF THE INVENTION

It is known that if the area within an electric motor where the alternating flux used in the motor stator is kept small, increased efficiency will be experienced, as there is less metal mass involved in the alternating flux area, and the flux paths that are being alternated are shorter, and therefore, less core losses occur than in a motor where larger areas of the total flux torque circuit are alternated.

To achieve these objectives, it is necessary that a motor configuration be used which makes major departures from common torque configurations and from the way flux is established and manipulated in the stator and rotor parts in order to create a spinning magnetic field that does not have a changing polarity.

The motor herein described, designated as a single field motor rotor, has such a configuration as described above. As set forth below, the unique construction of the motor of the invention will be appreciated, as well as the unique configuration of the non-alternating field used to create rotor and stator saturation and create the primary torque power, and the minimal area and mass in this total torque path that actually has to alternate is achieved to create the unique interplay of fields which spin this non-alternating torque field in the rotor torque area of the motor.

The configuration of the non-alternating flux of the single field rotor motor of the invention is very different from traditional electric motors. First, the flux used to create the primary torque in the rotor torque area of the motor is not created by either a cross-field arrangement between stator poles in the rotor torque area or by a field oriented so that its path runs radially in the stator core and manifests its opposite polarity through various pole faces in this same torque area. Rather, the primary flux which creates torque in the motor of the invention is set up axially from the endbells or end regions of the motor, which are made of solid ferromagnetic motor steel or equivalent magnetic flux conducting material and are part of the stator flux path and crosses a small air-gap between the inside face of each endbell to both side faces of a laminated, salient-poled rotor, which is much like those used in variable reluctance motors. The flux coming from the two opposing, inside endbell faces is of opposite polarity as to the axis of the motor, which means that the flux existing at the inside of each endbell and entering the laminated rotor is either both a North or both a South flux and is therefore 180° out-of-phase one to the other along the axis. When this out-of-phase flux from the endbells meets in the rotor torque area of the motor (in the core of the laminated rotor), the natural effect created by the flux itself is for this flux to spray radially in a plane perpendicular to the axis of the motor. The rotor lamination's axially spaced orientation also encourages the same effect, and the flux is turned by each lamination of the rotor outward to the rotor's radial edge where the salient poles are formed by the outer shape of the laminations. This causes all the rotor poles, whatever their number, to have the same polarized field, either all North or all South, exiting at their radial face. While this gives the same flux field polarity on the radial face of every rotor pole, it also creates a very balanced flux density in each rotor pole as compared to any of the other rotor poles. This configuration also creates an excellent ratio of flux concentration or focusing due to the two large surfaces on the sides of the rotor for the flux to enter, and, in prototypes of the invention, the ratio of the area of these two surfaces to the total area of the surfaces of the rotor pole faces where work is done is approximately 3:1. This allows for excellent saturation characteristics, and since the rotor never changes polarity while the motor is running, this saturation remains at peak in the rotor and its poles at all times.

When the flux exits the radial faces of the rotor poles, it crosses a small air-gap between those faces and the faces of the laminated stator poles. These laminated stator poles are always twice the number of the rotor poles, as the rotor poles faces are, together, equal to about 50% of the total outer diameter of the rotor, with the spaces between the salient poles being equal, together, to about 50% of that same outer diameter. This laminated section of the stator is on its outer circumference fitted into a ferromagnetic or equivalent housing of solid construction which joins to the ferromagnetic endbells, or the endbells themselves are actually formed so they meet in the center of the motor and join, forming both the housing and the endbells.

The actual source for the flux can be magnets, i.e., donut-type magnets which are magnetized through their thickness with a hole in the center for the rotor shaft to pass through, which are mounted to the inside of the endbells and become part of the endbell/stator, and the inside face of the magnets are nearly equal to the area of the sides of the rotor, minus its salient poles. The torque flux from the endbells would then actually cross the air-gap into the sides of the rotor from the surface of the magnet faces which are next to the rotor sides. The other option for creating the flux is to have each endbell have a single pole formed on its inside face which is equal to the area of one of the rotor sides with a donut-like center hole for the rotor shaft to pass through and with a direct current (DC) stator coil wound on the pole of each endbell so that they produce the same flux orientation as described above.

While it would appear at first that an extra air-gap (between the endbell and the rotor side) is added into the torque flux circuit, this is not the case. Because this flux orientation does not include, as traditional motors do, two stator pole/rotor pole air-gaps in the flux circuit, but only one, the number of air-gaps in the flux circuit are exactly the same. There are two other advantages to this configuration, as it related to this kind of air-gap design. First is the fact that one of the air-gaps in the single field rotor motor construction described (the one between the endbell and the rotor sides) has three times the surface available for flux to cross the air-gap than is available on the faces of the rotor and stator poles. The benefit is that the increased surface in this one air-gap means less energy is lost in the flux torque circuit. The second benefit is the fact that the air-gap between the endbell and the rotor side never changes (never alternately increases and diminishes) as the air-gap between rotor poles and the stator poles do. This means that one of the two air-gaps in the flux torque circuit is always at minimum thus making for greater efficiency of the flux circuit. This also means that when the phase coils first reverse the stator pole's polarity, and the rotor poles are most out of register with the in-phase stator poles, that there is approximately half the air-gap present in the torque circuit as there is in designs where the flux circuit is directed through two rotor/stator air-gaps. This increases the efficiency of the flux circuit at this critical point in the torque cycle which means that there is more flux, thus, more torque-per-watt, that acts on the rotor. And since this design also allows for all poles in both the rotor and the stator to contribute to the torque in the whole of every half-phase, there is no loss of torque surface in achieving this benefit. There is, in fact, an increase in torque surface as compared with most switched reluctance motors and other salient-poled motor designs.

The flux configuration of the motor of the invention can be further understood from FIGS. 1 and 2 of the accompanying drawings. FIG. 1 illustrates the configuration of the primary torque flux in a single field rotor motor as created either by the magnets or the DC coils and cores of the stator. FIG. 2 is an end and axial view of the flux circuits illustrated in FIG. 1, with the purpose of illustrating the 360° configuration of the flux circuits, even though there are arrows showing the flux paths only every 90° for the sake of clarity.

With respect to the preliminary understanding of inventive concepts, the flux configuration for the primary torque flux is illustrated in FIGS. 1 and 2. FIG. 1 shows the flux looking along the plane of the motor axis, and FIG. 2 is a perspective look along and down the plane of the motor axis, illustrating that this flux pattern, which is present at all times, is 360° around the plane of axis (even though for clarity it is only shown indicating the flux pattern every 90°). FIG. 3 of the drawing is similar to FIG. 1 with the addition of illustrating the motor parts that are part of the flux path if magnets are used, and FIG. 4 is the same as FIG. 3 except a DC coil is shown in place of the magnets on the stator.

The areas 101 of FIG. 1 indicate the area where the flux is created in the system either by permanent magnets or DC coils. The area marked 102 is the rotor-torque area of the motor, and the area marked 103 is the laminated pole area of the stator and is the only area where the flux is acted on to create the motor action. All the other areas of flux circuits 104 are solid motor steel parts of the stator such as the housing and endbells.

The method of creating torque with the above-described flux configuration is by means of phase coils on the laminated stator poles. As previously indicated, the stator poles are always twice the number of the rotor poles. As all the flux from the magnets or DC coils jump from the face of the magnets or DC coil pole faces, and cross the axial air-gap into the rotor sides and use the rotor poles to complete the magnetic circuit by jumping the radial air-gap back into the stator through the laminated poles of the stator and then through the solid stator housing and endbells, it is possible to cause rotation of the rotor by alternately making one set of every other stator pole in-phase with the torque flux and the other set of every other stator pole out-of-phase with the torque flux. This causes the flux to constantly seek the in-phase poles to keep its non-alternating flux circuit complete and thus create a constant torque on the rotor, while at the same time, the rotor poles repel the out-of-phase set of stator poles as they have an unchanging polarity.

Another unique characteristic of the motor of the invention is that the laminated, salient pole rotor is polarized like a radial magnet with the same polarity of magnetic field on all its outside circumference. This means that as the phase coils on the laminated part of the stator reverse from in-phase to out-of-phase in relation to the polarity of the rotor magnetization, it actually creates a repulsion on the rotor poles. This means that all the poles on the stator and all of the poles on the rotor are contributing to the torque of the rotor in both the positive and negative electrical phases. This is very different from other laminated, salient poled rotor motors which create torque primarily through magnetic attraction. For most that use this kind of laminated, salient poled rotor, the rotor is merely acting like a rotary shunt between magnetically in-phase faces of stator poles since the rotor has no set polarity of its own.

It will also be apparent that the polarization of the rotor in the single field rotor motor never changes, thus conserving the field applied to it by either the magnets or the DC coils. This is different from other motors which use a laminated, salient poled rotor, because when the rotor of those motors is acting as a kind of rotary shunt between in-phase stator pole faces, it necessitates that the rotor poles and the rotor mass be constantly reoriented magnetically.

Efficiencies in motors constructed in accord with the invention are as high as 90% and are readily economically achieved down to ¼ HP motor size and below. Higher than 90% efficiency will be achieved in larger than ¼ HP versions, all as single phase motors.

General Description of the Stator Phase Coil Configuration for the Single Field Motor Rotor The phase coil part of the single field rotor motor can be wound three different ways. All methods are simple and give much the same performance characteristics, but with each being more suitable to different production demands and circuit requirements. The more traditional method is to wind a coil on each laminated stator pole so that each coil is reverse-wound in relation to any phase coil on either side of it along the inside circumference of the stator. This is a simple alternating clockwise, counter-clockwise winding pattern. Usually, the coils are connected in series electrically so that they can all be excited together by the control circuit as shown in FIGS. 13 and 14. This means that every other pole will have a North magnetic polarity on its face, and the intervening poles will each have a South magnetic polarity on its face. With a single-phase control circuit which supplies a positive half-phase and a negative half-phase, the polarity of the two sets of poles is alternated as desired.

The effect is that every other stator pole is either in-phase or out-of-phase with the primary torque flux being created by the stator magnets or DC coils. This causes the rotor poles, which are half the number of the stator poles and spaced so they can only come into register with every other stator pole at any position which allows a register position of stator and rotor poles to be repelled by the one set of stator poles because they are out-of-phase with the circuit path of the primary torque flux from the stator magnets or DC coils, and to be attracted by the other set of stator poles because they are in-phase with the primary torque flux from the same source. By simply alternating the phase coils between positive and negative with a circuit which primarily controls the timing of this alteration, spinning in-phase areas on the inside face of the stator poles which is always 50% of the available stator pole face surface, which corresponds to every other stator pole face, is created. This results in the rotor constantly "chasing" these continually rotating in-phase areas and constantly repelling the rotating out-of-phase areas which are also 50% of the available stator poles surface and correspond to the other set of every other stator pole face.

One of the alternate ways of winding the phase coils is to use what may be called a "Z" coil winding. A "Z" coil winding is used with an even number of poles and is simply a passing of a winding wire through the slots of the stator in a zig-zag manner, going around and around the stator until the desired number of turns are in each slot. This, of course, means that there is really only one coil which is woven back and forth between the slots as it is placed around the circumference of the inside of the stator. As this coil reverses its direction in relation to every other slot of the stator, it creates the same alternating flux pattern on the stator poles faces. As the "Z" coil winding only loops around one side of each pole, it effectively shortens the overall length of the total in-series phase winding and thus the overall resistance. This kind of winding is also very simple for some types of production applications of this motor as a single coil of the required number of turns can be wound with a diameter which allows it to be slid into the stator slots in a "Z" manner.

The second alternate method of winding the phase coils is to use two "Z" coils, wound in the same slots but 180° opposite to each other so that the side loops of one "Z" coil loops around one side of every other stator pole (the side it loops around alternating with every pole) while the second "Z" coil winds around the opposite side of every other pole from that of the first "Z" coil. They can then be connected in parallel for one voltage, i.e. 115 volts and connected in series for a second voltage, i.e. 230 volts. Also, with this double "Z" coil method of winding the phase coils, it is easy to use a bifilar type motor circuit where two separate sets of coils are powered as DC circuits with one being positive and the other being negative in relation to each other. This allows the single field rotor motor of the invention to use very economical motor control circuits which are inexpensive as compared to H-bridge type control circuits, while at the same time offering various simple speed control methods which are continuously variable between the slowest and fastest rotation of the motor.

The single "Z" coil method of winding the phase coils is shown in FIG. 9 of the attached drawings, while the double "Z" coil method of winding is shown in attached FIG. 10.

All three methods of winding the phase coils on the stator give much the same performance and can be used according to production or circuit needs.

BRIEF DESCRIPTION OF THE DRAWINGS

The aforementioned objects and operation of the invention will be appreciated from the following description and accompanying drawings wherein:

FIG. 5 illustrates an embodiment of the single field motor rotor of the present invention using permanent magnets, FIG. 6 is the same motor as shown in FIG. 5, except the permanent magnets have been replaced by coil cores, FIG. 7 is an end view of a typical single field rotor motor utilizing the concepts of the present invention.

DESCRIPTION OF THE PREFERRED EMBODIMENTS

Figure 1:
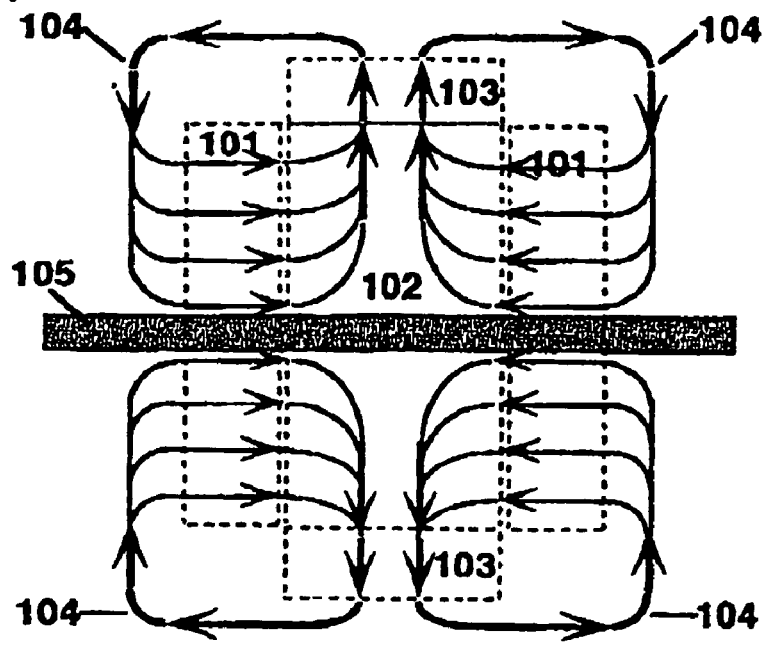
FIG. 1 illustrates a typical flux configuration in a single field rotor motor in accord with the present invention.

FIG. 1 schematically illustrates the configuration and paths of the primary torque flux in the single field rotor motor in accord with the invention regardless of whether the flux is created by permanent magnets or DC coils and cores of the stator. The areas illustrated and enclosed by dotted lines 101 is the area where the flux originates in the magnets or DC coil cores. The area in dotted line box 102 is the rotor-torque area of the motor where the rotor rotates and illustrates how the opposing polarity of the flux entering the rotor-torque area from opposite sides causes it to spray perpendicular to the motor axis. The rotor's laminations also are oriented perpendicular to the axis which further encourages this effect, and the laminations of the rotor become the ferrite path for the flux to travel to the circumference of the rotor where the rotor poles are formed. Areas marked 103 represent the areas of the stator which are laminated with poles and wound with phase coils and illustrate how the flux uses this part of the stator to pass into the solid, i.e. non-laminated, parts of the stator where arrows 104 illustrate the return of the flux by means of the non-laminated part of the stator to the opposite side of the magnets or DC coil core from which it originally existed, thus completing the flux circuits. Shaft 105 is shown in FIG. 1 in order to give perspective to the observer.

Figure 2:
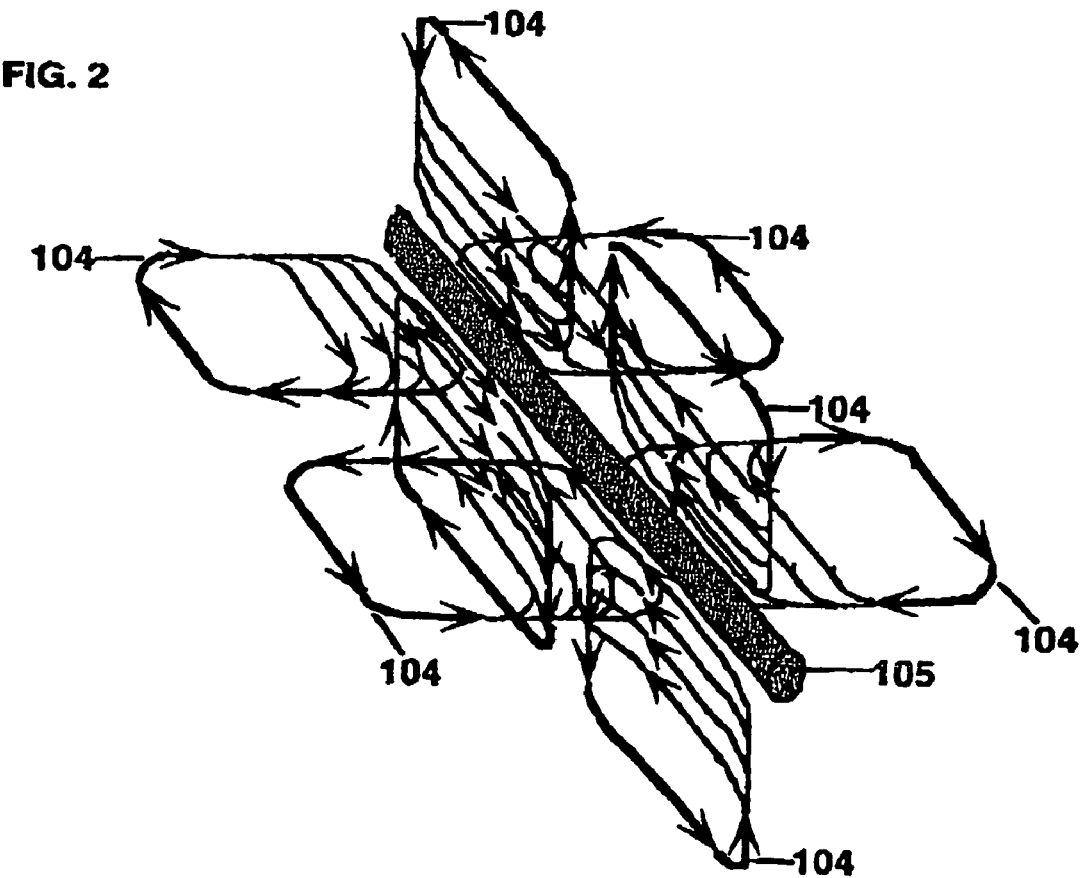
FIG. 2 is a perspective view along the plane of the axis of rotation of the flux configuration of FIG. 1.

FIG. 2 is a compromise end and axial view of the flux circuits illustrated in FIG. 1 and illustrates the 360° configuration of the flux circuits, even though there are arrows showing the flux paths only every 90° for the sake of clarity. Flux 104 and shaft 105 are indicated in order to give perspective in relation to FIG. 1.

Figure 3:
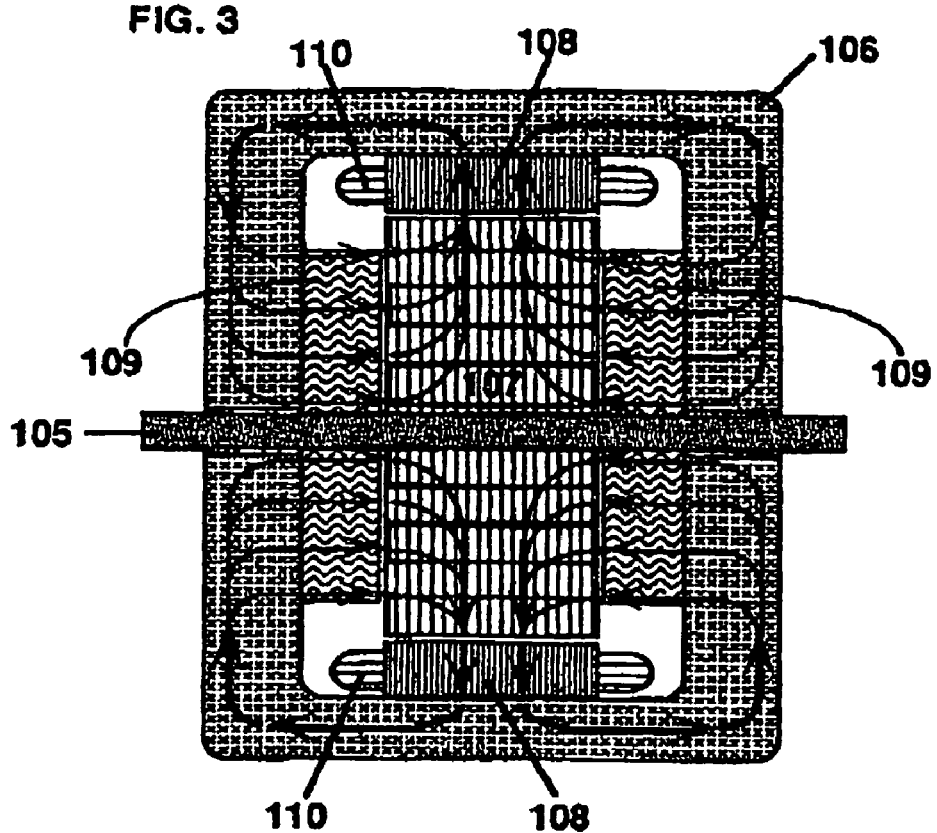
FIG. 3 is similar to FIG. 1 and illustrates the motor parts that are part of the flux path if magnets are used.

With reference to FIG. 3, which illustrates a typical single field rotor motor in accord with the present invention, and is similar in operation to the description of FIG. 1, and in which various parts of the motor are indicated, a permanent magnet 109 is oriented so that there is a North field on both inside faces toward a rotor 107, which is laminated so that the flux travels to its circumference where the rotor poles are formed. The flux from the magnets 109 cross the unchanging minimum air-gaps between their inside faces and the sides of the rotor 107, which is mounted on the shaft 105, and enters the rotor laminations, then turns perpendicular to the axis of the motor and travels along the laminations of the rotor 107 to all 360° of the rotor circumference. It then concentrates in the rotor poles as they extend to within a few thousandths of an inch of the stator poles faces of stator laminations 108. The flux then crosses the air-gap between the rotor pole faces on the outside circumference of the rotor 107 and the inside faces of the poles of the laminated part of the stator, which is indicated by the part 108, which has phase coils 110 wound in all its slots. The flux passes through the laminations 108 to its outside circumference. The outside circumference of 108 is press fitted into the inside circumference of stator housing 106, which is the solid and non-laminated ferromagnetic or equivalent part of the stator and endbells. The flux uses the solid stator housing 106 to return to the South face of the magnets 109, completing the flux circuit.

Figure 4:
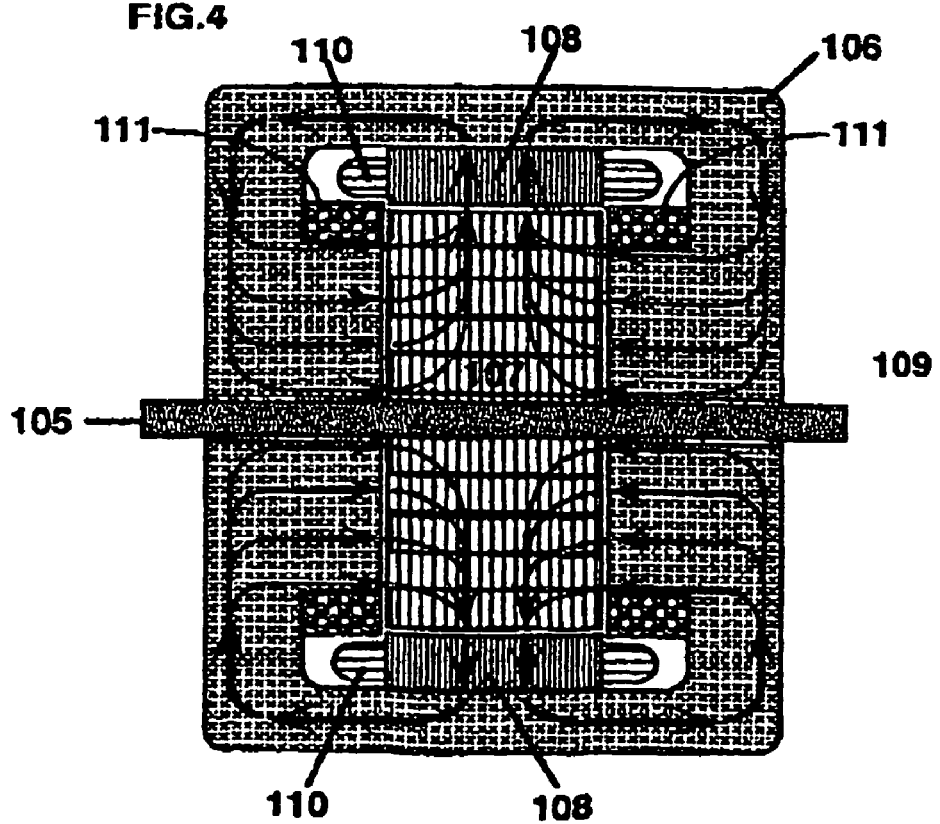
FIG. 4 is similar to FIG. 3, except a direct current (D.C.) coil is shown in place of the magnets on the stator.

FIG. 4 illustrates a motor utilizing the circuits of FIG. 3 wherein identical reference numerals indicate parts previously described. The magnets of the stator are replaced by DC coils 111 and the cores of those coils which are made part of the solid stator housing 106.

FIG. 5 shows an embodiment of the single field motor rotor of the present invention utilizing permanent magnets. The solid stator housing 106 and associated endbells 114 have magnets 109 bonded to their inside faces so as to properly position the magnets' inside faces next to the sides of rotor 107 with a minimum air gap. The left solid stator housing/endbell 114 has stator laminations 108, with phase coils 110 press fitted into it so as to position the stator pole faces properly around the rotor so that rotor poles can rotate a few thousandths of an inch from the inside faces of the stator poles and come into register with every other stator pole alternately. Rotor 107 is mounted on shaft 105 and is held in place by bearings 112 fitted into the bearing housings of the solid stator housing/endbells of 106 and 114.

FIG. 6 is the same motor as illustrated in FIG. 5, except that the magnets 109 have been replaced by extending coil cores from the solid stator housing/endbells 120 and 121 such as at 113 indicated on 121. DC coils 111 are then wound on these cores to create the primary torque flux for the motor to replace the permanent magnets 109 of the embodiment of FIG. 5.

FIG. 7 is a sectional end view of the single field rotor motor in accord with the present invention illustrating the motor parts from a different section than that previously described. A rotor 203 is illustrated with salient poles 204, which are eight in number and sized and positioned so that they can come into register with every other pole face of the stator poles 202 of a laminated stator 201. The stator poles 202 are sixteen in number and equally proportioned and spaced around the inside circumference of the stator 201 with sixteen slots between them. Stator laminations 201 are shown pressed into a solid stator/endbell 205. The stator pole faces are equal to the total inside face of the stator circumference only minus the slot openings. The rotor pole faces are equal to the face of any one pole of the stator and are spaced so that they come into register with every other stator pole all at the same time.

Figure 8:
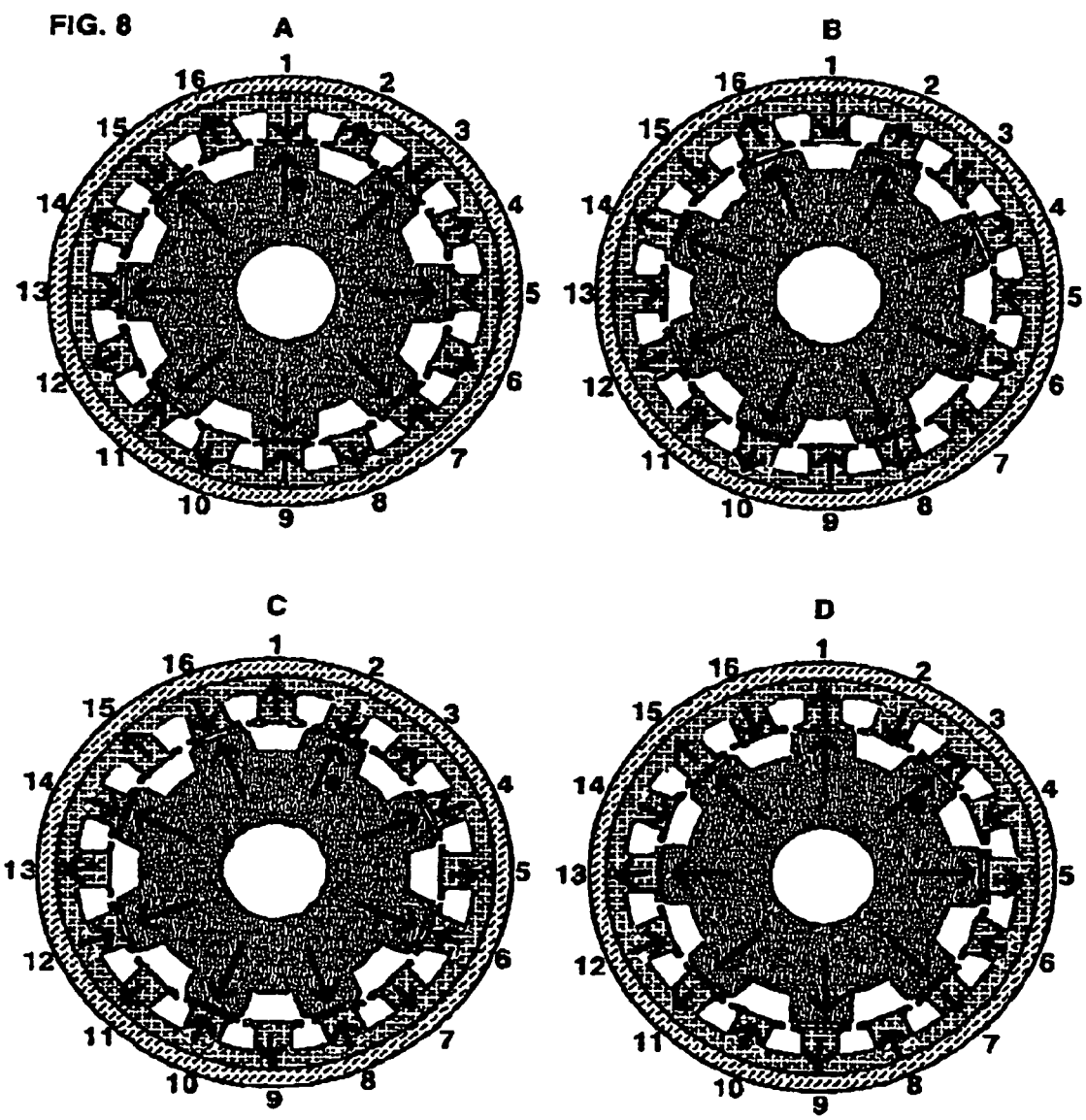
FIGS. 8A-8D illustrate the method of torque application in the single field motor rotor of the present invention.

FIGS. 8A-8D illustrate the method of torque in the single field rotor motor in accord with the present invention. In FIG. 8A, the rotor poles are shown in register with the odd numbered poles of the stator. The arrows on the odd stator poles show that the phase coils (not shown) have been energized so that the odd poles of the stator are out-of-phase magnetically with the torque flux in the rotor poles which is North on the face of all the rotor poles as indicated by the arrows, and this is coming from the magnets or DC coils of the stator, while the even numbered poles of the stator are energized so that they are in-phase magnetically with the flux in the rotor poles. This will cause the rotor poles to be magnetically repelled away from the odd numbered poles of the stator and attracted toward the even numbered poles of the stator. This will result in the rotor poles coming into register and magnetically in-phase with the even numbered poles, as illustrated in FIG. 8B.

Then, as illustrated in FIG. 8C by the change in the orientation of the arrows on the stator poles, the phase coils all reverse their polarity causing the even numbered stator poles of the stator to be out-of-phase magnetically with the torque flux in the rotor poles, which is coming from the magnets or DC coils, while the odd numbered poles of the stator are energized so that they are in-phase magnetically with the flux in the rotor poles. This will cause the rotor poles to be magnetically repelled away from the even numbered poles of the stator and attracted toward the odd numbered poles of the stator. This will result in the rotor poles coming into register and magnetically in-phase with the odd numbered poles, as illustrated in FIG. 8D. This is repeated again and again by the control circuits, thus causing continuous torque on the rotor.

Figure 9:
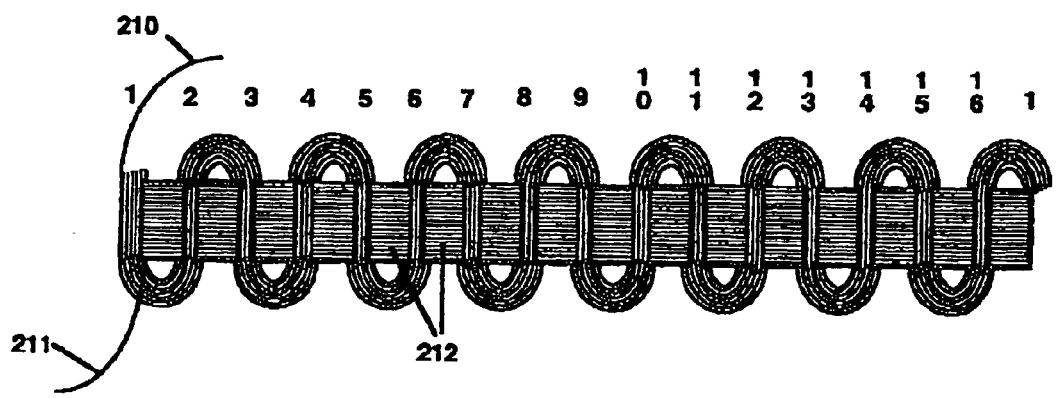
FIG. 9 illustrates an alternative winding of the phase coils in the slots of the laminated portion of the stator.

FIG. 9 illustrates the alternate way of winding the phase coils in the slots of the laminated part of the stator. A magnetic winding wire end 210 is alternately laced through the stator pole slots so that it loops around only one side of each stator pole so as to loop around the opposite side of every other stator pole. The number of turns in the slots are determined by the number of times the winding wire makes a complete trip through all the slots. When the desired number of turns is achieved, the winding wire is finished with an end 211. By applying single phase current to this kind of winding, all the stator poles 212 will have alternating North and South poles on their faces in the positive half-phase and will reverse their pattern in the negative half-phase.

Figure 10:
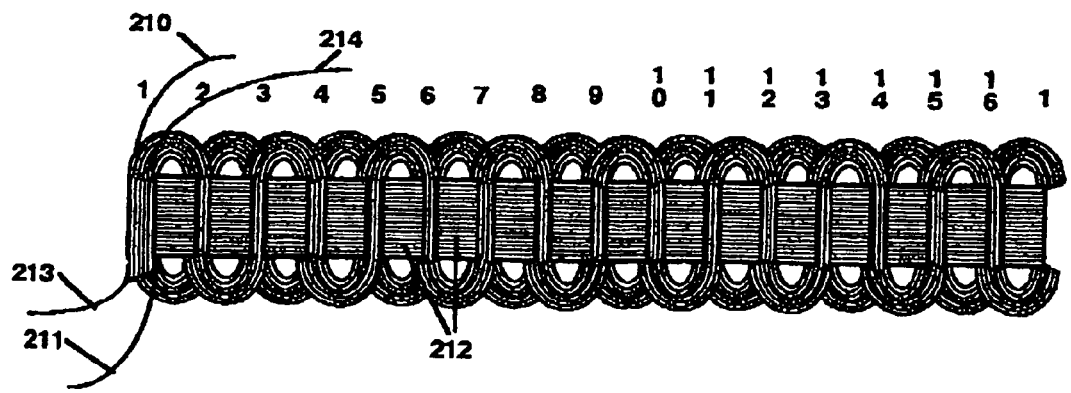
FIG. 10 is similar to FIG. 9 wherein a second winding in the opposite direction has taken place.

By winding a second winding in the same manner, only in the opposite direction so that the windings loop around the opposite sides of the stator poles from the first winding, as illustrated in FIG. 10, a bifilar phase coil configuration is formed which can be powered and controlled by a much simpler circuit which is primarily two DC circuits powered alternately, or multi-voltage options are created if the coils are used in parallel or series with a more traditional H-bridge type circuit.

Figure 11:
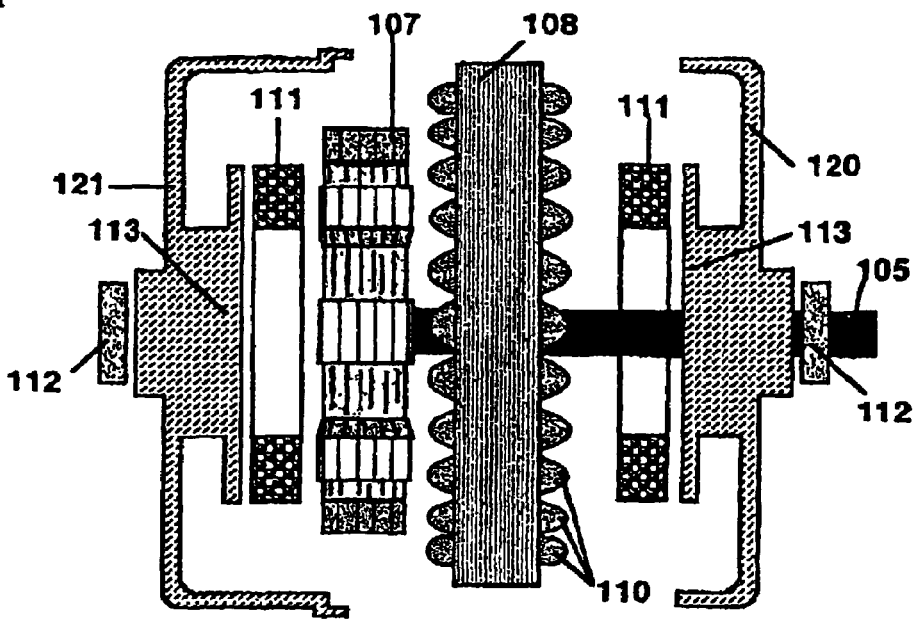
FIG. 11 is an exploded view of the motor illustrated in FIG. 6.

FIG. 11 is an expanded view of the motor illustrated originally in FIG. 6. Solid stator/endbells 120 and 121 have coil cores formed on their inside faces, as indicated at 113. The DC coils 111 would be wound on these cores respectively to create the primary torque flux in the motor. The rotor 107 is laminated from soft motor steel with salient poles spaced and proportioned so that they can come into register with every other pole of the laminated stator 108 as it rotates. The laminated part of the stator 108 is illustrated with phase coils 110 wound on its poles which may be a traditional type winding with a single coil around each pole or with the "Z" type windings illustrated in FIGS. 9 and 10.

Figure 12:
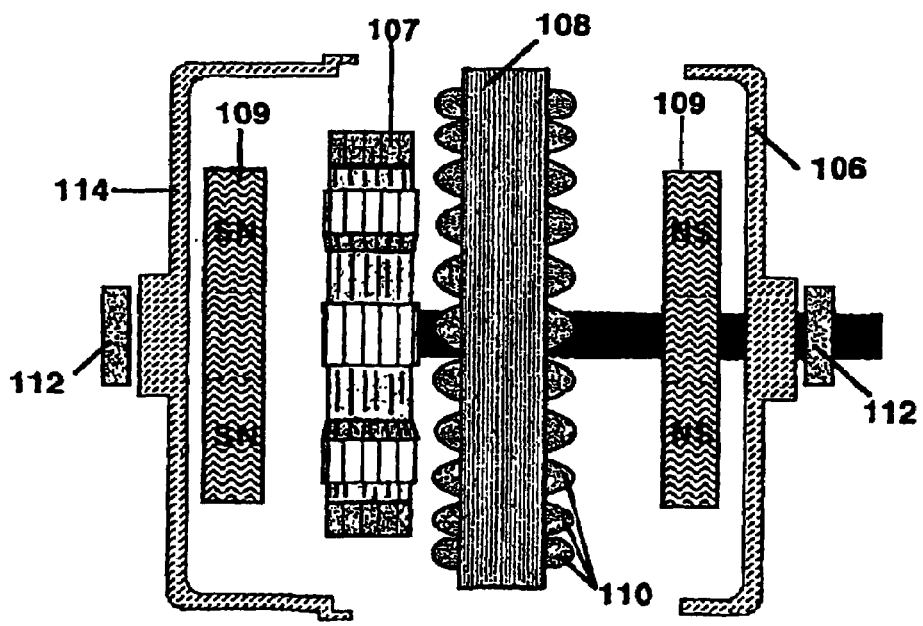
FIG. 12 is an exploded view of the permanent magnet motor illustrated in FIG. 5.

FIG. 12 is an expanded view of FIG. 5, which is the same motor as FIGS. 6 and 11, except that magnets 109 are used to create the primary torque flux in the motor rather than the DC coils. Accordingly, the solid stator housing/endbells 106 and 114 are fabricated without the DC coil cores, which the other version is shown having, and instead have the magnets 109 bonded to the inside face of the solid stator/endbell in place of the core and DC coil.

Figure 13:
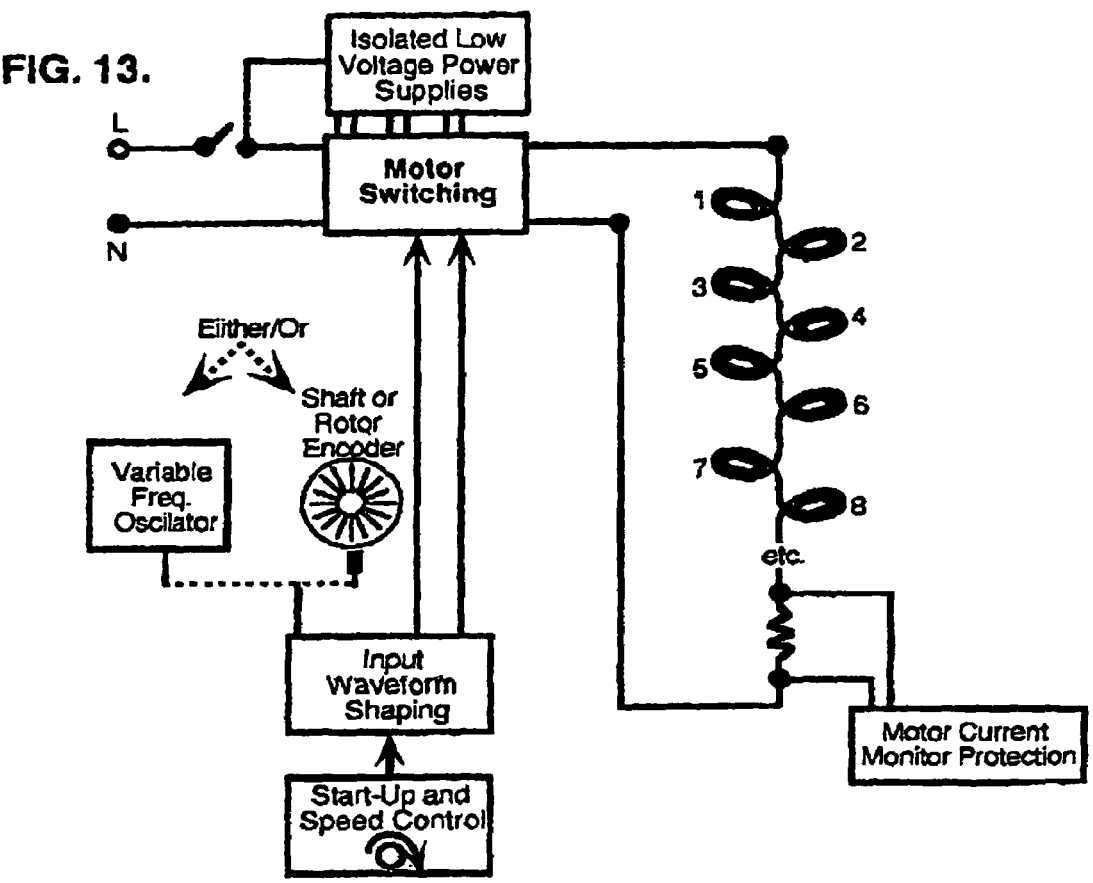
FIG. 13 illustrates a circuit for use with the magnet version of the invention, FIG. 14 discloses a circuit similar to that of FIG. 13 which may be used with the DC coils version of the invention.

In FIG. 13, a standard H-bridge circuit is illustrated which may be used with the motor of the invention having an optional control of the circuit, either from closed-loop rotor feedback circuits or from an open control by means of a variable frequency oscillator. The efficiencies are slightly higher with the closed-loop control, but in many applications, the open control gives the desired control characteristics with only a few percent lower efficiency. The closed-loop control also offers speed control by means of an optional speed control circuitry. This circuit in FIG. 13 is to be used with the magnet version described above of the single field rotor motor.

Figure 14:
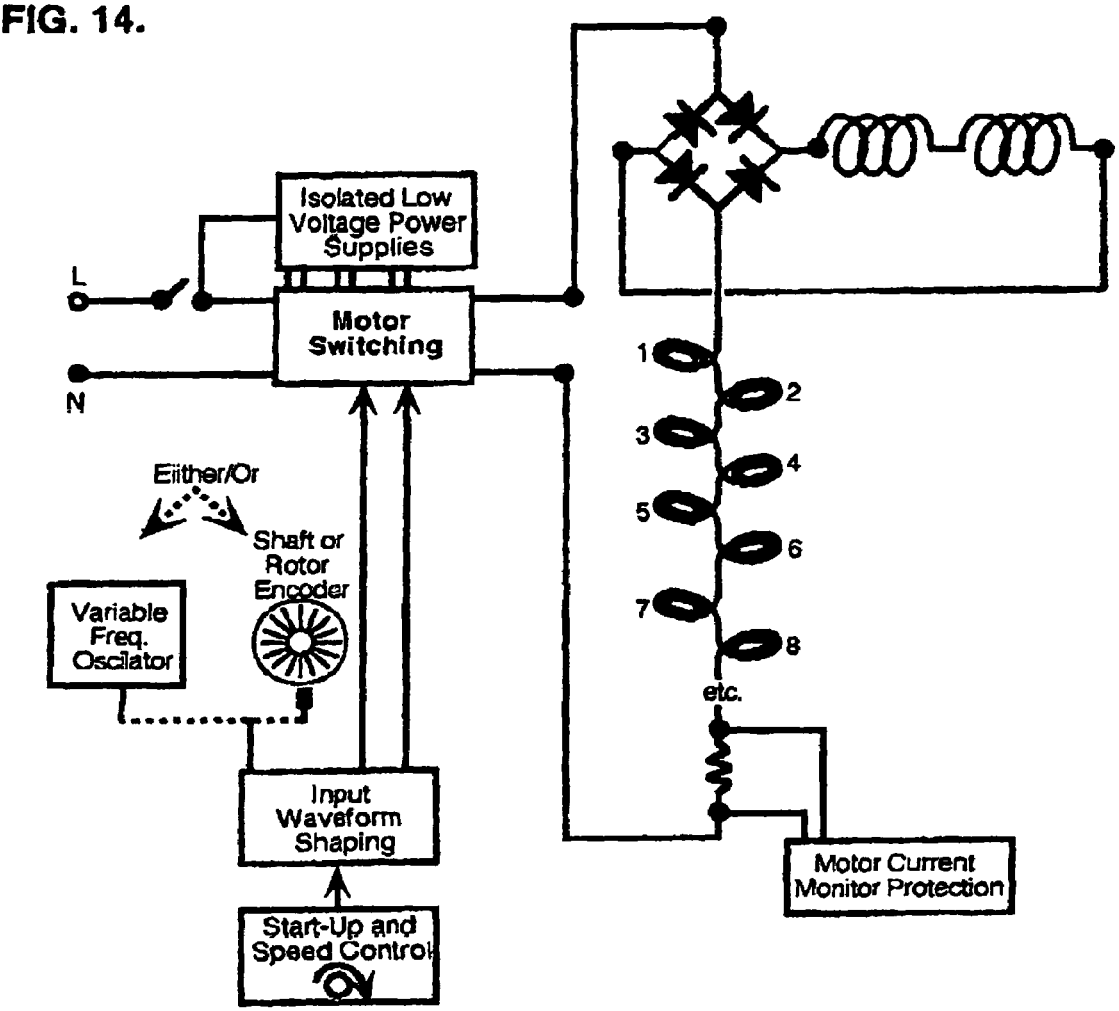

In FIG. 14, the same circuit as shown in FIG. 13 is illustrated with the addition of a bridge circuit in series with the phase coils for driving the two DC coils on the stator endbells of the single field rotor motor version that replaces the stator magnets with DC coils wrapped on cores formed into the endbells of the motor as described above.

Figure 15:
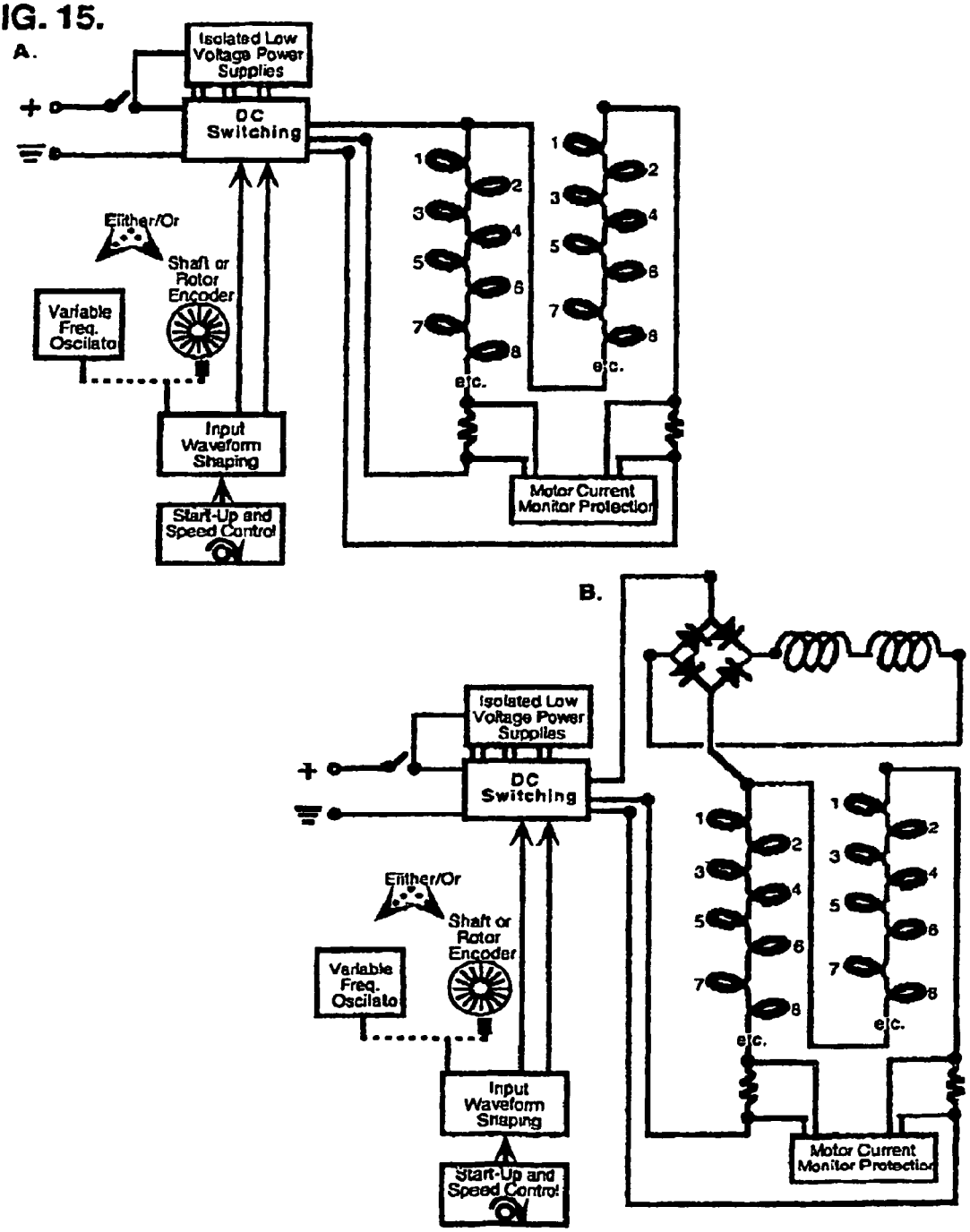
FIGS. 15A-15B show circuits which may be used with the single field rotor motor of the invention of the bifilar-type drive.

FIGS. 15A and 15B show a third and fourth kind of circuit which can be used to drive the single field motor rotor. These circuits are bifilar circuits. Accordingly, two identical wires are wound on the phase coils at the same time. Both sets of resulting windings are connected to a DC controller that has two separate DC circuits that can be alternated either by closed-loop or open controls. The two separate windings are connected 180° electrically opposite to each other and are used alternately to create one of the opposing half-phases. Thus, when the first circuit is powered by the controller, a North-South pattern as previously described is created around the inside face of the laminated stator poles. When the second circuit is powered, each pole is reversed and creates the alternate pattern. These are alternated by the controller to cause the motor to run in the normal manner. This bifilar circuit is useful for applications where inexpensive circuits are needed for the application. These circuits can also offer very inexpensive speed control.

The difference between FIG. 15A and FIG. 15B is that FIG. 15A is for the magnet version of the single field rotor motor of the invention, and FIG. 15B is for use with the DC coil version that uses DC coils instead of magnets on the stator endbells. As will be appreciated, FIG. 15B includes a bridge circuit and two DC coils not illustrated in FIG. 15A.

From the above illustrations and description, it will be appreciated that an unique flux pattern and stator force is created to produce a rotating, electric motor. It is to be understood that the inventive concepts of the present invention are defined by the scope of the following claims and revisions and improvements which may be apparent to those skilled in the art and are considered to come within the scope of the following claims and the scope of the claimed language.

What is claimed is:

1. A single field rotor motor comprising, in combination, a stator housing having axially spaced end regions, a shaft rotatably extending through said end regions, a ferromagnetic, laminated rotor mounted on said shaft extending between said end regions having radial sides disposed adjacent said end regions and having spaced salient poles defined on the periphery of said rotor, said rotor poles having a peripheral width, magnetic means creating magnetic fields at said stator housing end regions of axial polarity creating a single polarity of field on all the peripheral rotor poles by means of inducing flux into the sides of the rotor axially across an unchanging air-gap which is constantly at minimum between said magnetic means in said stator housing and said rotor sides, a stator circumscribing said rotor having an inner circumference, a plurality of stator poles defined on said stator inner circumference having faces having a circumferential width, there being twice the number of stator poles than rotor poles, the circumferential width of said stator poles being substantially equal to the peripheral width of said rotor poles and a small radial air gap existing between said rotor and stator poles, each of said stator poles having a coil for creating a magnetic pole force within said stator coil, and circuit means for alternately changing said stator coils to alternately change the polarity of a given stator pole to alternately attract and repel said rotor poles to produce rotation of said rotor.

2. In a single field rotor motor as in claim 1, wherein the peripheral spacing between adjacent rotor poles is equal.

3. In a single field rotor motor as in claim 1, wherein the inner circumferential spacing between adjacent stator poles is equal.

4. In a single field rotor motor as in claim 1, wherein the peripheral spacing between adjacent rotor poles is equal and the inner circumferential spacing between adjacent stator poles is equal.

5. In a single field rotor motor as in claim 1, said magnetic means creating magnetic fields at said housing end regions comprising permanent magnets.

6. In a single field rotor motor as in claim 1, said magnetic means creating magnetic fields at said housing end regions comprising electric coils wound around a ferrite core and energized by a direct current with the resulting flux being induced into the sides of the rotor axially across an unchanging air-gap which is constantly at minimum between the magnetic means in the stator housing end region and the rotor sides.

7. In a single field rotor motor as in claim 1, said magnetic means creating magnetic fields at said housing end regions across an air-gap between the stator housing end regions and the sides of the rotor, said air-gap being always at minimum and non-expanding and also providing an increase of opposing ferrite surfaces on either side of the air-gap as compared with the poles surface of the rotor and stator for completion of flux circuits in the motor stator housing and rotor.

8. In a single field rotor motor as in claim 1, said magnetic means creating magnetic fields at said housing end regions and transferring the magnetic flux across a constantly minimum air-gap between said housing end regions and rotor sides so as to create a magnetically polarized rotor which has no magnetic flux producing members which rotate or touch the rotor.

9. In a single field rotor motor as in claim 1, said magnetic means creating magnetic fields at said housing end regions so as to set up flux circuits in said stator housing and rotor that originate in the stator housing end regions and induce a field into the rotor by axially crossing the air-gaps between the stator end regions and the rotor sides, but the field then orients radially in the rotor laminations and exert torque radially between the poles of the rotor and the poles of the stator, the flux circuit being completed axially using the stator housing and stator housing end regions.

* * * * *